United States Patent
Rastegar

(10) Patent No.: US 10,461,379 B2
(45) Date of Patent: Oct. 29, 2019

(54) METHOD FOR ASSEMBLING AND ACTIVATING LITHIUM-ION BASED RESERVE BATTERIES

(71) Applicant: Jahangir S Rastegar, Stony Brook, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 184 days.

(21) Appl. No.: 15/791,276

(22) Filed: Oct. 23, 2017

(65) Prior Publication Data
US 2019/0123400 A1   Apr. 25, 2019

(51) Int. Cl.
*H01M 10/44* (2006.01)
*H01M 10/04* (2006.01)
*H01M 10/0525* (2010.01)

(52) U.S. Cl.
CPC ....... *H01M 10/446* (2013.01); *H01M 10/049* (2013.01); *H01M 10/0525* (2013.01)

(58) Field of Classification Search
None
See application file for complete search history.

(56) References Cited

U.S. PATENT DOCUMENTS

| 2002/0102462 A1* | 8/2002 | Huggins | H01M 4/0438 |
| | | | 429/231.9 |
| 2010/0313410 A1* | 12/2010 | Min | H01M 10/0567 |
| | | | 29/623.2 |

* cited by examiner

*Primary Examiner* — Wyatt P McConnell

(57) ABSTRACT

A method for assembling a lithium-ion reserve battery. The method including: charging an assembled lithium-ion reserve battery, the assembled lithium-ion battery including electrodes forming a battery cell, electrolyte and a membrane separating the battery cell and the electrolyte, the electrodes being charged into a charged state; disassembling the charged lithium-ion reserve battery; rinsing and drying at least the electrodes of the disassembled lithium-ion reserve battery; and reassembling the lithium-ion reserve battery with the rinsed and dried electrodes in the charged state and without the electrolyte; wherein the reassembling includes hermetically sealing a housing containing the battery cell. A method for activating such lithium-ion battery further includes, subsequent to the reassembly, introducing the electrolyte into the battery cell to activate the lithium-ion battery.

11 Claims, 1 Drawing Sheet

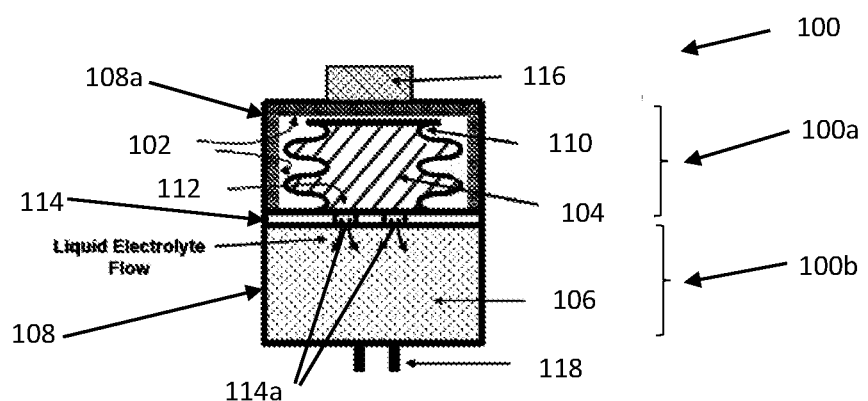

METHOD FOR ASSEMBLING AND ACTIVATING LITHIUM-ION BASED RESERVE BATTERIES

BACKGROUND

1. Field of the Invention

The present disclosure relates generally to reserve batteries, and more particularly to high energy and long run-time reserve batteries that are based on rechargeable Lithium-ion battery technology and which are safe and are provided with the means for activation and performance at very low temperatures for munitions applications and the like.

2. Prior Art

Reserve batteries have long been used in munitions and in other applications in which the battery needs to be activated for a single time use and for a relatively short time. There are two basic reserve batteries that are currently available, namely thermal batteries and liquid reserve batteries. Currently available liquid reserve batteries suffer from many shortcomings, including low energy density as compared to lithium ion batteries and low temperature performance. In fact, at temperatures below around −20 to −30 degrees C., their performance is greatly degraded, which makes them incapable of providing the required power in many munitions applications. In addition, in some munitions applications in which munitions have to stay powered for days and sometimes for a month, current liquid reserve batteries cannot be kept operational for the entire mission period of time. Thermal reserve batteries provide power for a very short time, usually in seconds for relatively small batteries, and are therefore obviously impractical for the latter applications due to their very short run time of at most several minutes. Their power density is also significantly lower than those of lithium ion batteries.

SUMMARY

A need therefore exists for reserve batteries that are high energy, can be activated and stay operational at very low temperatures and can stay operational over periods of several weeks and possibly a month.

Accordingly, a reserve battery based on the Lithium ion battery technology is provided that is significantly higher in energy density than currently available reserve batteries; that can be activated and stay operational at very low temperatures of even below −54 degrees C., and can stay operational over periods of several weeks and possibly a month.

The disclosed Lithium-ion based reserve are rechargeable following activation, and can be used with a recently developed technology (see U.S. application Ser. No. 15/049,043, filed on Feb. 20, 2016, attorney docket No. 10118, the contents of which are incorporated herein by reference) to achieve fast charging rates and high performance at very low temperatures of even below −54 degrees C. The basic construction of the reserve batteries makes them possible to be packaged to withstand very high G setback accelerations of over 50,000 Gs.

Most current lithium ion battery (LIB) employs a graphite anode and a metal oxide cathode, which are separated by a microporous polymer membrane impregnated with lithium salts dissolved in organic solvents. The most widely used cathode at present is lithium cobalt oxide ($LiCoO_2$), though many other cathode materials have emerged during the last decade. The current LIB is safer than the old version of lithium batteries based on a lithium metal anode, because no pure lithium (which is a strong fire hazard) is involved in the battery's chemistry. The charge/discharge mechanism is based on movement of lithium ions in and out of the electrode materials without disintegrating their structures (intercalation). Nevertheless, commercial LIBs can still catch fire from time to time and their safety issues still need to be addressed.

In addition to low temperature charging issues with lithium ion batteries, once charged, their performance rapidly deteriorates as the temperature drops during use. As a result, the only currently available method of keeping them operational at low temperatures is their continuous heating by heating blankets or the like to prevent their core temperature from falling significantly below zero degrees C., noting that lithium ion battery performance drops even at temperatures of −5 to −10 degrees C., becoming highly inefficient as approaching temperatures of around −30 degrees C. and below.

The LIB cells are structured on a pair of solid electrodes with a porous solid separator membrane between them. The porous separator is filled with a liquid electrolyte, which is lithium salts dissolved in aprotic organic solvents (alkyl carbonates). The role of separator is mainly to prevent an electrical short circuit between the two electrodes. The separator does not provide a sealing effect. That means the liquid electrolyte is present not only in the porous separator but also in any space inside the closed cells. This cell structure has the potential of a LIB to be designed as a liquid reserve battery.

In the LIB-based reserve batteries of the present invention, the cells are assembled with electrolyte and charged. The cells are then disassembled and the electrolyte is removed and the cells rinsed and dried. The liquid electrolyte is then released into the battery cell during the activation process. Using a novel technology, the stored liquid electrolyte is preheated and pressurized via provided pyrotechnic material for release into the battery cell to ensure proper operation at low temperatures as well as for fast initiation (see U.S. Provisional Application No. 62/383,452 filed on Sep. 4, 2016, attorney docket no. 10132, the contents of which are incorporated herein by reference). The reserve battery activation pyrotechnics may be ignited using commonly used inertial or electrical igniters. Such reserve LIBs are particularly suitable for applications in which high density power sources have to be provided to certain devices for periods that could extend to many days or even over a month. For such missions, the proposed lithium ion reserve batteries are superior to all available liquid reserve batteries due to their significantly higher power density and low self-discharge rates. The batteries can also provide enough power for low power electronics at very low temperatures that may be below −54 degrees C., while the low temperature performance enhancement technology described in U.S. application Ser. No. 15/049,043, filed on Feb. 20, 2016, attorney docket No. 10118, the contents of which are incorporated herein by reference, can be used rapidly bring their internal temperature up for full power delivery.

By constructing lithium ion batteries as reserve batteries with separate electrolyte compartments, the shelf life of the battery will be very long and significantly longer than the required 20 years once packaged in a hermetically sealed housing. Since the main source of safety concern in Lithium-ion batteries is the electrolyte, since the electrolyte is separately housed prior to activation, safety issues are minimized, particularly for munitions applications.

BRIEF DESCRIPTION OF THE DRAWINGS

These and other features, aspects, and advantages of the apparatus of the present invention will become better understood with regard to the following description, appended claims, and accompanying drawings where:

The FIGURE illustrates the schematic of the basic pyrotechnic activated reserve battery for fast activation and for low-temperature performance.

DETAILED DESCRIPTION OF THE PREFERRED EMBODIMENT

The LIB cells are structured on a pair of solid electrodes with a porous solid separator membrane between them. The porous separator (most commonly made of polyethylene and polypropylene) is filled with a liquid electrolyte, which is lithium salts dissolved in aprotic organic solvents (alkyl carbonates). The role of separator is mainly to prevent an electrical short circuit between the two electrodes. The separator does not provide a sealing effect. That means the liquid electrolyte is present not only in the porous separator but also in any space inside the closed cells.

The basic process of manufacturing a typical Lithium ion battery can be described using the process of assembling a single Lithium ion cell in an engineering development Swagelok cell. Once assembled the cell is then filled with the electrolyte from the top side and the cell is sealed. The assembled battery is then ready to be charged. This process is well known in the art and is used by battery development engineers for testing various battery chemistries and designs.

In the method of fabricating the Lithium ion based reserve battery of the present invention, following the Lithium ion battery assembly and introduction of the battery electrolyte described above, the battery is fully charged. The cell (in this case the Swagelok cell) is then disassembled, the electrodes are rinsed and dried. The electrodes, now at charged state, can be reassembled together with the same or a new membrane (the membrane is not generally costly and difficult to thoroughly clean and dry). The charged Lithium ion battery without its electrolyte can now be stored for a very long time as long as it is packaged in a hermetically sealed housing—as is the practice for almost all liquid reserve and thermal reserve batteries.

The liquid electrolyte is stored outside the cell in a sealed compartment as is the common practice and/or known in the art for currently available liquid reserve batteries. The liquid electrolyte is then injected into the charged Lithium ion battery at the time of activation, also using one of the methods well known in the art for activation of currently available liquid reserve batteries. One such method of activation is described below.

Hereinafter, the charged Lithium ion battery cell without its electrolyte together with its electrolyte in a sealed compartment is referred to as "Lithium-ion reserve battery".

It is appreciated by those skilled in the art that the performance of Lithium ion batteries significantly degrades at low temperatures and become almost inactive at temperature below −30 to −40 degrees C. For this reason, it is highly desirable to make the disclosed Lithium-ion reserve batteries of the present invention capable of being activated at very low temperatures, even at or below −54 degrees C. as required for many munitions. In addition, to achieve fast activation, it is highly desirable to inject the electrolyte into the battery cell under pressure.

To achieve the above goal of fast activation as well as very low temperature activation capability, as described below, pyrotechnic material is used to heat and inject the liquid electrolyte into the reassembled battery cell under pressure as illustrated in the schematic FIGURE (see U.S. Pat. No. 9,252,433, Issued on Feb. 2, 2016, the entire contents of which is incorporated herein by reference). In this embodiment, the pyrotechnic charge serves the following purposes. Firstly, it is used for battery activation, i.e., to release the stored liquid battery electrolyte into the battery cell. Secondly, it generates heat, which is used to heat the electrolyte to allow the battery to be activated and function at very low temperatures and at the same time enhance its penetration rate into the battery cell as well as its rate of diffusion. Thirdly, the pressure generated by the initiation of the pyrotechnic material is used to inject the electrolyte into the battery under pressure.

A configuration of a pyrotechnic charge activated liquid reserve battery 100 is shown in the schematic drawing of the FIGURE. The pyrotechnic charge 102 serves the following purposes. Firstly, it is used for battery 100 activation, i.e., to release stored liquid battery electrolyte 104 into the battery cell 106. Secondly, it generates heat, which is used to heat the electrolyte 104 to allow the battery 100 to be activated and function at very low temperatures and at the same time enhance its penetration rate into the battery cell 106 as well as its rate of diffusion. Thirdly, the pressure generated by the initiation of the pyrotechnic material 102 is used to inject the electrolyte 104 into the battery cell 106 under pressure.

The LIB based reserve battery illustrated in the FIGURE is constructed with two separate compartments, a battery cell compartment 100b and an electrolyte storage and injection mechanism compartment 100a. The battery housing 108 may have a circular or rectangular or other appropriately shaped cross-section. The liquid electrolyte 104 is stored in a collapsible (bellow like) metal storage unit 110. Outlets holes 112 are provided on a layer (plate) 114 separating the electrolyte storage compartment 100a from the battery cell compartment 100b and are sealed by relatively thin diaphragms (preferably metallic) 114a. Pyrotechnic materials 102, which can be formed in one or more layers, as shown in the FIGURE, are provided in a sealed volume between the collapsible liquid electrolyte storage unit 110 and the compartment walls 108a. The battery 100 is provided with either an initiation device 116 for igniting the pyrotechnic materials 110, which can be an inertial initiator for gun-fired applications or an electrical initiation element, such as those programmable electrical initiators developed by Omnitek Partners LLC. An advantage of such initiator is its small size and that it could be packaged inside the electrolyte compartment, thereby significantly reducing the power source size.

The LIB based reserve battery 100 of the FIGURE is activated by igniting the pyrotechnic material 102 with the indicated (inertial or electrical) initiation device 116. The burning pyrotechnic material 102 will generate heat, which is used to heat the stored electrolyte 104, and generate pressure within the sealed volume between the collapsible liquid electrolyte storage unit 110 and the compartment walls 108a. The generated pressure would then act over the surface of the collapsible liquid electrolyte storage unit 110, forcing it to collapse, thereby forcing the heated and pressurized liquid electrolyte 104 to rupture the diaphragms 114a in the outlet holes 112 separating the liquid electrolyte 104 from the battery cell 106 and rapidly injecting the heated liquid electrolyte 104 into the battery cell 106 to activate the battery cell and provide power at the battery terminals 118.

Thus, the LIB based reserve battery concept shown schematically in the FIGURE is constructed with two separate compartments, a battery cell compartment and an electrolyte storage and injection mechanism compartment. The battery housing may have a circular or rectangular or other appropriately shaped cross-section. The liquid electrolyte is stored in a collapsible (bellow like) metal storage unit. Outlets holes are provided on the layer (plate) separating the electrolyte storage unit from the battery cell and are sealed by relatively thin diaphragms (preferably metallic). Pyrotechnic materials, preferably in a layer as shown in the schematic of the FIGURE, are provided in the sealed volume between the collapsible liquid electrolyte storage unit and the compartment walls. The battery is provided with either an inertial initiator for gun-fired applications or an electrical initiation element for igniting the pyrotechnic material.

The LIB based reserve battery of the FIGURE is activated by igniting the pyrotechnic material with the indicated (inertial or electrical) initiation device. The burning pyrotechnic material will generate heat, which is used to heat the stored electrolyte, and generate pressure within the sealed volume between the collapsible liquid electrolyte storage unit and the compartment walls. The generated pressure would then act over the surface of the collapsible liquid electrolyte storage unit, forcing it to collapse, thereby forcing the heated and pressurized liquid electrolyte to rupture the diaphragm separating it from the battery cell and rapidly injecting the heated liquid electrolyte into the battery cell.

The collapsible liquid electrolyte storage unit is designed with a relatively large surface area to allow for rapid transfer of heat to the liquid electrolyte. The storage unit is also preferably designed to deform plastically under the generated pressure so that once the pressure has subsided, a minimal amount of the liquid electrolyte is returned back to the storage unit. Alternatively, particularly when the size of the battery allows, one-way valves may be used to prevent the liquid electrolyte's return.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for assembling a lithium-ion reserve battery, the method comprising:
    charging an assembled lithium-ion reserve battery, the assembled lithium-ion battery including electrodes forming a battery cell, electrolyte and a membrane separating the battery cell and the electrolyte, the electrodes being charged into a charged state;
    disassembling the charged lithium-ion reserve battery;
    rinsing and drying at least the electrodes of the disassembled lithium-ion reserve battery; and
    reassembling the lithium-ion reserve battery with the rinsed and dried electrodes in the charged state and without the electrolyte;
    wherein the reassembling includes hermetically sealing a housing containing the battery cell.

2. The method of claim 1, wherein the charging comprises fully charging the lithium-ion battery.

3. The method of claim 1, wherein:
    the rinsing and drying does not include rinsing and drying the membrane; and
    the reassembling comprises reassembling the lithium-ion battery with a new membrane.

4. The method of claim 1, wherein subsequent to the disassembly, storing the electrolyte for a subsequent activation of the lithium-ion battery.

5. The method of claim 4, wherein the storing comprising storing the electrolyte in the hermetically sealed housing.

6. A method for activating a lithium-ion reserve battery, the method comprising:
    charging an assembled lithium-ion reserve battery, the assembled lithium-ion battery including electrodes forming a battery cell, electrolyte and a membrane separating the battery cell and the electrolyte, the electrodes being charged into a charged state;
    disassembling the charged lithium-ion reserve battery;
    rinsing and drying at least the electrodes of the disassembled lithium-ion reserve battery;
    reassembling the lithium-ion reserve battery with the rinsed and dried electrodes in the charged state and without the electrolyte, wherein the reassembling includes hermetically sealing a housing containing the battery cell; and
    subsequent to the reassembly, introducing the electrolyte into the battery cell to activate the lithium-ion battery.

7. The method of claim 6, wherein the charging comprises fully charging the lithium-ion battery.

8. The method of claim 6, wherein:
    the rinsing and drying does not include rinsing and drying the membrane; and
    the reassembling comprises reassembling the lithium-ion battery with a new membrane.

9. The method of claim 6, wherein subsequent to the disassembly, storing the electrolyte for a subsequent activation of the lithium-ion battery.

10. The method of claim 9, wherein the storing comprising storing the electrolyte in the hermetically sealed housing.

11. The method of claim 10, wherein the introducing comprises heating the electrolyte and forcing the heated electrolyte under pressure into the lithium-ion battery.

* * * * *